United States Patent [19]

Piepho

[11] 4,415,467

[45] * Nov. 15, 1983

[54] AGENT FOR THE PURIFICATION OF WASTE WATERS AND PROCESS FOR ITS PRODUCTION

[75] Inventor: Ralf F. Piepho, Wennigsen, Fed. Rep. of Germany

[73] Assignee: Colloid Piepho, Wilmington, Del.

[ * ] Notice: The portion of the term of this patent subsequent to Jun. 1, 1999 has been disclaimed.

[21] Appl. No.: 383,608

[22] Filed: Jun. 1, 1982

Related U.S. Application Data

[63] Continuation-in-part of Ser. No. 240,874, Mar. 5, 1981, Pat. No. 4,332,693, which is a continuation of Ser. No. 867,240, Jan. 6, 1978, abandoned.

[51] Int. Cl.³ .............................. C02F 1/28; C02F 5/10; B01J 20/12; B01J 20/34
[52] U.S. Cl. ...................................... 252/181; 252/86; 252/87; 210/698; 210/701; 210/708
[58] Field of Search ............................ 252/181, 86, 87; 210/698, 701, 708

[56] References Cited

U.S. PATENT DOCUMENTS

| | | | |
|---|---|---|---|
| 3,350,304 | 10/1967 | Bacon | 252/181 |
| 3,428,558 | 2/1969 | Murphy | 252/181 |
| 3,446,731 | 5/1969 | Harsh | 210/708 |
| 3,487,928 | 6/1970 | Canevari | 210/708 |
| 4,238,330 | 12/1980 | Fong et al. | 210/708 |

*Primary Examiner*—John E. Kittle
*Assistant Examiner*—Robert A. Wax
*Attorney, Agent, or Firm*—Mason, Kolehmainen, Rathburn & Wyss

[57] ABSTRACT

The present invention is directed to a chemical composition for treating contaminated waste waters, particularly waste waters in the form of oily emulsions, to adsorb the contaminants between platelets of activated bentonite and encapsulate or trap the contaminants between the platelets so that the contaminants cannot be leached out into the waste water. The composition includes an acid, such as adipic acid; a coagulant such as aluminum sulfate or ferric sulfate; an activated betonite; lime CaO or Ca(OH)$_2$; and bentonite containing at least about 5% by weight calcium aluminum silicate. The invention also is directed to a process for producing the chemical composition, and a method of treating contaminated waste waters with the chemical composition. The composition may include a polymeric flocculating agent, such as polyacrylamide having a molecular weight of at least one million, for flocculation of the encapsulated activated bentonite, or the flocculating agent may be added to the waste water separately, after encapsulation.

16 Claims, No Drawings

AGENT FOR THE PURIFICATION OF WASTE WATERS AND PROCESS FOR ITS PRODUCTION

CROSS REFERENCE TO RELATED APPLICATIONS

This application is a continuation in part of Ser. No. 240,874, now U.S. Pat. No. 4,332,693, which is a continuation of Ser. No. 867,240 filed Jan. 6, 1978, now abandoned.

FIELD OF THE INVENTION

The present invention relates to a chemical composition and method for treating sludge, sewage and particularly industrial waste waters, and more particularly to a water purification agent or composition and method for treating and purifying oily waste water and to a process for producing the purification composition.

BACKGROUND OF THE INVENTION

The widespread use of oils, fats and waxes in industrial operations, as in motor vehicle technology, in the material-removing treatment of metals in chemical factories, refineries, and the like would lead to considerable environmental damage if the oil-emulsified waste waters were not pre-treated to remove a substantial percentage of oil contaminants contained therein.

Numerous procedures have been devised for eliminating harmful substances from waste waters. One such procedure chemically reacts the oily water in monophase or polyphase systems, for example, by combustion or biological degrading (decomposition). This process, however, requires complex reaction installations resulting in considerable expenditures. Furthermore, such methods include gaseous combustion by-products which, themselves, must be eliminated in order to avoid environmental damage.

Another known practice evaporates the water from an oily water emulsion, leaving the substances contained therein in concentrated form, whereby the concentrate may subsequently be deposited or burned in suitable places. The evaporation of the waste waters, however, requires a large amount of energy and is, therefore, not economically practical.

A further method of waste water treatment separates emulsified oils, fats or other floating substances in the waste water by chemically, thermally, electrically or mechanically decomposing the emulsion and absorbing the precipitated substances. Yet another process separates out extremely fine dirt particles from the waste water by chemical flocculation and binds the separated dirt particles to a calcium hydrate compound. This process is carried out using iron-II salts, aluminum sulfate, calcium hydrate, and lime or sodium aluminate in conjunction with activated silicic acid.

The most usual method of treatment splits and emulsion by adding an electrolyte. The electrolyte serves to precipitate the oil, fat or other floating particles, for sedimentation and/or absorption.

These known processes, however, have inherent weaknesses and are not adaptable to all situations. Frequently, the waste water has to be recirculated several times in order to obtain an extensive separation of the oil, fat or other contaminants. Also, problems often arise in the adsorptive purification of the waste water because of the limited chargeability of the adsorption agent or because of the deficient bonding of the oily substance to the adsorbing agent, whereby the oily contaminant is again liberated by environmental influences and its harmful effects develop anew.

SUMMARY OF THE INVENTION

Broadly, the present invention is directed to a chemical composition for treating contaminated waste waters, particularly waste waters in the form of oily emulsions, to adsorb the contaminants between platelets of activated bentonite and encapsulate or trap the contaminants between the platelets so that the contaminants cannot be leached out into the waste water. The composition includes an acid, such as adipic acid; a coagulant, such as aluminum sulfate or ferric sulfate; an activated bentonite; lime, CaO or Ca(OH)$_2$, and bentonite containing at least about 5% by weight calcium aluminum silicate. The invention also is directed to a process for producing the chemical composition, and a method of treating contaminated waste waters with the chemical composition. The composition may include a polymeric flocculating agent for flocculation of the encapsulated activated bentonite, or the flocculating agent may be added to the waste water separately, after encapsulation.

Accordingly, an object of the present invention is to provide a chemical waste water treating composition capable of being securely bonded to the contaminant material for flocculation and subsequent removal from the waste water.

Another object of the present invention is to provide a waste water treating composition and method including an activated bentonite capable of adsorbing unusually high quantities of waste water contaminants; bentonite containing at least 5% by weight calcium aluminum silicate; lime in the form of CaO or Ca(OH)$_2$ for pozzolonic reaction with the calcium-containing bentonite to form a barrier around the activated bentonite platelets for encapsulating the adsorbed contaminants within the activated bentonite so that the contaminants do not leach out into the waste water.

Another object of the present invention is to provide a waste water treating composition and method including activated bentonite, calcium bentonite, lime, aluminum sulfate, and an acid such as adipic acid so that when the composition is mixed with a waste water, the acid will instantaneously lower the pH of the waste water to split apart a portion of the emulsified contaminants, particularly oils, so that the contaminants are more readily adsorbed between platelets of the activated bentonite although, with further mixing, and dissolving of the lime, the pH of the waste water will be raised slightly.

These and other objects and advantages of the present invention will become apparent from the following detailed description of the invention.

DETAILED DESCRIPTION OF THE INVENTION

The composition and method of the present invention are employed to adsorb and encapsulate unusually high quantities of waste water contaminants, particularly emulsified oily wastes, and encapsulate the contaminants so that they cannot be leached out back into the waste water.

The composition of the present invention generally includes activated bentonite for unusually high adsorption of contaminants in a waste water, particularly oils and greases; a contaminant coagulant such as aluminum sulfate or ferric sulfate particularly useful for coagulating oils and greases in industrial waste waters so that they can be readily adsorbed by the activated bentonite; lime in the form of CaO or Ca(OH)$_2$; bentonite containing calcium aluminum silicate for pozzolonic reaction with the lime to encapsulate the adsorbed contaminants within the activated bentonite; and an acid, such as adipic acid, capable of being dissolved in the waste water prior to complete dissolution of the lime to achieve an instantaneous lowering of pH of the waste water so that the emulsified oil, grease or other contaminants may be partially split and thereby more readily adsorbed by the activated bentonite.

The activated bentonite adsorbs the contaminants from the waste water, and is encapsulated by the pozzolonic reaction of lime and the calcium portion of the bentonite, and any pozzolonic reaction occuring between the lime and any remaining calcium portion of the activated bentonite. A flocculating agent should be added to the waste water, with the composition or after encapsulation, particularly if the activated bentonite is ground to a very fine mesh size so that the contaminants and bentonite can be easily removed from the waste water, such as by filtration, leaving a treated waste water generally capable of being discarded directly into the sewer. The flocculating agent, for example a polymeric organic compound, such as polyacrylamide having a molecular weight of 1–5 million, can be added directly to the waste water treating composition of the present invention or can be added to the waste water after adsorption and encapsulation. Additionally, it is sometimes desirable to add an agent capable of adsorbing colored organic contaminants, such as talc or activated carbon, although such decolorizing agents are not essential to the compositions and methods of the present invention.

There are a number of methods of activating bentonite such as the so-called "wet methods," which consist of introducing activators which are either dissolved or in suspension. As activators, there may be used compounds which contain exchangeable ions, e.g. sodium carbonate. According to one method, a solution of the activator is introduced into the raw bentonite in an amount of from several up to 22.5 percent by weight in relation to the mass of the bentonite up to the flowability point. According to a second of these methods, a solution of activator is introduced into the raw bentonite in an amount of from 22.5 percent by weight in relation to the mass of the bentonite up to the flowability point of the bentonite. According to a third method, a solution of the activator is introduced into the raw bentonite in an amount giving a mixture with a flowability point about that of the bentonite.

With respect to the flowability point, this means that an amount of the solution is employed which, when added to the bentonite and mixed with it, changes the mixture from the solid state to fluid state. The flowability point is different for various types of bentonites and depends upon their respective percentage contents of minerals belonging to the montmorillonite groups.

To activate the raw bentonite material, a suitable amount of the activator solution is introduced into the bentonite and the material then is dried, sometimes with mixing and turning to accelerate the drying process.

One modification of this method is an activation based on bringing the whole mass of bentonite material to a state above the flowability point by the addition of an activator with the aid of different kinds of mixers, after which a suitable coagulant, making possible the passing of the whole mixture through a filter press, is introduced.

In accordance with U.S. Pat. No. 3,240,616, the bentonite can be activated without mixing and the amount of activator is correlated with the montmorillonite content of the bentonite to increase the strength of the bentonite. The time of activation can vary from one up to about one hundred hours.

Acid activation generally is carried out by mixing bentonite clay with water to form a suspension. A mineral acid such as hydrochloric or sulfuric, is added to the suspension and the mixture is heated to about 100° C. for several hours. The heated mixture then is diluted with cold water and washed, for example in a filter press to remove excess acid almost completely. The activated bentonite is dried to a convenient moisture content, for example 8% to 15% by weight and then pulverized to a suitable size. The acid treatment eliminates alkalies and calcium and reduces the content of magnesium, iron and aluminum. The B.E.T. surface area of activated bentonites is on the order of 240–300 $M^2$/gram and the adsorption capacity is greatly increased by activation. The acid treatment alters the pore size distribution by removing Al, Mg and Fe from the octahedral bentonite layer and replacing the exchangeable ions with hydrogen and aluminum. In addition, a dissolution process takes place which varies in extent according to the concentration of the acid, the temperature, the pressure and the time. As a result, the crystalline structure of the montmorillonite is modified by the dissolution of Al-, Fe- and Mg-ions, and the specific surface as well as the porosity is increased. The morphological change which occurs after treatment with hydrochloric acid (840 milliequivalents per 100 g bentonite) as opposed to the appearance of untreated natural bentonite is readily apparent.

An acid treatment of bentonite results in the replacement of the substitutable cations by H-ions as well as a partial dissolution of the Al-, Fe- and Mg-ions in the silicate lamella of the montmorillonite from around the edges. This leaves voluminous deposits of silicic acid which most probably results in wedge-shaped bursting action causing a loosening of the crystal texture and a disorientation of the silicate layer. Thus, as a result of the voluminous incidence of silicic acid together with the separation of hydrogen-montmorillonite-silicate-lamella out of the crystal lattice, the specific surface is greatly enlarged and the adsorption capacity greatly increased.

Bentonite also can be activated by alkalies in accordance with the present invention. The alkaline activation of bentonite is based mainly on an ionic exchange reaction, in which the earthy base ions of the montmorillonite are replaced by alkali ions. These ions are located on the edges and surfaces of the scale-like montmorillonite crystals. So that the exchange takes place as completely as possible, water should be present in an alkaline activation in order to dissolve the alkali ions. Furthermore, the reaction can be accelerated to more rapid surface enlargement through shearing forces and by lowering the water viscosity and an increase in the ion diffusion rate through temperature.

Through ion exchange the already thin montmorillonite crystals are fractured into many even thinner silicate lamella. In comparison with the relative compact crystals found in the presence of earthy base ions which permit only a limited swelling in water, for sodium montmorillonite individual silicate layers can flake off of the crystal.

The alkaline activation, based on the quantity of water involved, results in the familiar high plasticity or viscosity and the thixotropy of the more highly swelling active bentonite.

For commercial, large scale industrial production of activated bentonite, the activation, i.e., the conversion of an earthy base bentonite with low swelling properties into an alkali (sodium) bentonite with high swelling ability, is usually conducted with soda, since soda is the most efficient and economical activator. Suitable alkali activating chemicals include sodium phosphate, sodium oxalate, sodium carbonate and possibly sodium sulfate or other sodium compounds, which react with substitutable earthy base ions of the montmorillonite. Other known ion exchange reactions, for example with ion exchangers or with concentrated sodium salt solutions, are not normally used to produce activated bentonite on a larger scale because they are difficult to work with and uneconomical.

Activation reactions can be expressed schematically as follows:

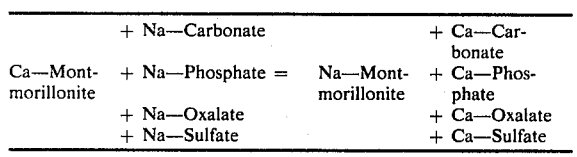

Each of these ion exchange reactions not only produces sodium montmorillonite, but also in every case a calcium compound which is not readily soluble in water.

Further, bentonite, particularly those which already have naturally occuring substitutable bound alkali ions, can be activated by treatment with magnesium salts, i.e. magnesium sulfate, or magnesium salts in combination with alkali salts, as disclosed in German patent specification No. 1,081,346. Bentonite activated in any manner is useful as the activated bentonite in accordance with the present invention. A particularly useful activated bentonite Tixoton is acid activated and contains approximately, by weight: $SiO_2$: 56.7%; $Al_2O_3$: 20.2%; CaO: 2.4%; MgO: 4.3%; $Na_2O + K_2O$: 2.7%.

The amount of activated bentonite included in the waste water is, of course, dependent upon the amount of contaminants contained in the waste water but, generally for a typical waste water containing less than about 1% oil or grease, activated bentonite in an amount of at least about 0.5 kilogram per cubic meter of waste water, and generally in an amount of 0.5–1.0 kilogram of activated bentonite per cubic meter of waste water is sufficient to adsorb substantially all of the waste water contaminants.

It has been found that the amount of bentonite containing calcium aluminum silicate for pozzolonic reaction with lime should be included in the composition for addition to the waste water in accordance with the present invention in an amount of at least about 30%, based on the dry weight of the activated bentonite, to provide sufficient pozzolonic reaction for encapsulation of the activated bentonite after adsorption of the contaminants. While there is no upper limit to the amount of calcium bentonite, amounts greater than about 100%, based on the dry weight of activated bentonite, will be wasted since generally 30% to 50% calcium bentonite by dry weight of activated bentonite is sufficient to completely encapsulate the contaminants within the activated bentonite.

Lime in the form of CaO or $Ca(OH)_2$ is included in an amount sufficient for pozzolonic reaction with the bentonite containing calcium aluminum silicate and, generally, the amount of lime should be at least 50% based on the dry weight of the bentonite containing calcium aluminum silicate up to about 75% based on the dry weight of the bentonite containing calcium aluminum silicate to achieve sufficient pozzolonic reaction for encapsulation of the activated bentonite. Lime in amounts greater than about 75% based on the dry weight of bentonite containing calcium aluminum silicate can be used but results in wasted lime with no apparent advantage.

Generally, contaminants such as oil and grease or organic contaminants such as dyestuffs are difficult to remove from waste water because they are in the form of an emulsion and do not readily separate from the waste water.

In accordance with an important feature of the present invention, the chemical waste water treating composition includes an acid or acid salt such as adipic acid, acetic acid or any other strong or weak organic or inorganic acid for the purpose of instantaneous lowering of the pH of the waste water for partial splitting of the emulsified oil, grease or other emulsified waste water contaminant. The acid may be in solid or liquid form—if liquid form, it can be absorbed into the other components of the composition of the present invention so that the chemical composition can be conveniently packaged in relatively dry form. Adipic and acetic acids are useful relatively weak organic acids. Stronger acids such as hydrochloric, phosphoric, sulfuric and the like may be used in accordance with the present invention but it is preferred to employ a relatively weak organic acid or other chemical capable of weakening the waste water emulsion.

In accordance with the present invention, the acid or acid salt is dissolved or dispersed relatively quickly and homogeneously more readily than the lime so that upon addition of the chemical composition of the present invention to a waste water, there is an instantaneous slight lowering of pH in the waste water capable of splitting apart at least a portion of the oil, grease or other contaminants contained in the waste water so that the contaminants may be readily adsorbed into the activated bentonite prior to the pozzolonic reaction between lime and calcium bentonite to achieve substantially complete adsorption of the contaminants within the activated bentonite, and thereafter encapsulation.

In accordance with another important feature of the present invention, a coagulant such as aluminum sulfate or ferric sulfate is included in the composition of the present invention for contaminant coagulation and subsequent adsorption by the activated bentonite. The contaminant coagulant, such as aluminum sulfate or ferric sulfate, is included in amounts which vary with the amount of contaminant contained in the waste water, but generally the coagulant is added in an amount of at least about 30 grams of coagulant per cubic meter of waste water, and preferably 30–50 grams of coagulant per cubic meter of waste water. The coagulant, in this quantity, sufficiently treats the contaminants, particularly oils and greases, for adsorption by the activated bentonite in typical waste waters containing less than about 1% oil or grease.

The flocculating agent, forming part of the composition of the present invention or added to the waste water after encapsulation of the activated bentonite containing adsorbed contaminants, can be any flocculating agent useful in flocculating the contaminants in the particular waste water being treated. Particularly useful flocculants are the polymeric organic cationic or non-ionic flocculants such as polyethyleneamine having a molecular weight of at least 25,000; poly-4-vinyl-N-butylpyridonium bromide having a molecular weight of at least 25,000; and polyacrylamide having molecular weight at least one million, and preferably in the range of of 1 to 5 million. For a typical waste water containing less than 1% by weight oil, grease or other contaminant, the flocculating agent is added to the waste water in an amount of at least 5 grams of flocculating agent per cubic meter of waste water to achieve sufficient flocculation of the encapsulated activated bentonite so that the activated bentonite and adsorbed contaminants may be easily removed from the waste water, such as by filtration or the like. When the flocculating agent is included in the chemical composition of the present invention, generally it is included in an amount of flocculating agent in the range of 0.5–05% based on the weight of activated bentonite to flocculate all of the activated bentonite for later separation from the waste water. Accordingly, the flocculating agent generally will form about 0.1 to 2% based on the total weight of the composition of the present invention.

Typical waste water treating compositions of the present invention are set forth in Examples 1–3 as follows:

| EXAMPLE 1 | |
|---|---|
| Activated bentonite | 35–48 kg. |
| Lime CaO or Ca(OH)$_2$ | 12–15 kg. |
| Bentonite (containing calcium alumium silicate) | 20–28 kg. |
| Coagulant (aluminum sulfate or ferric sulfate) | 17–23 kg. |
| Acid i.e., adipic acid | 2.0–3.0 kg. |
| EXAMPLE 2 | |
| Talc | 1.5–2.5 kg. |
| Activated bentonite | 35–48 kg. |
| Lime CaO or Ca(OH)$_2$ | 12–15 kg. |
| Bentonite (containing calcium alumium silicate) | 20–28 kg. |
| Coagulant (aluminum sulfate or ferric sulfate) | 17–23 kg. |
| Acid i.e., adipic acid | 2.0–3.0 kg. |
| EXAMPLE 3 | |
| Activated bentonite | 35–48 kg. |
| Lime CaO or Ca(OH)$_2$ | 12–15 kg. |
| Bentonite (containing calcium alumium silicate) | 20–28 kg. |
| Coagulant (aluminum sulfate or ferric sulfate) | 17–23 kg. |
| Acid i.e., adipic acid | 2.0–3.0 kg. |
| Flocculating agent (polyacrylamide M.W. 2. × 10$^6$) | 0.3–0.5 kg. |

The composition of Example 1 will provide adsorption and encapsulation of the contaminant from the waste water but does not include a flocculating agent which may be added later for convenient removal of the encapsulated contaminants from the waste water. Accordingly, sometimes it will be necessary to later add a flocculating agent, such as polyacrylamide, to the waste water after encapsulation using the composition of Example 1.

According to one specific embodiment of the present invention, 87.5 to 120.0 kg of the chemical agent for the treatment of oily wate water is composed of the compounds in the proportions of Example 4:

| EXAMPLE 4 | |
|---|---|
| COMPOUNDS | RANGE (By Weight) |
| Talc* | 1.5–2.5 kg. |
| Adipic acid | 2.0–3.0 kg. |
| Aluminum sulfate | 17–23 kg. |
| Activated bentonite | 35–48 kg. |
| Flocculating agent, for example a polymer organic compound, such as polyacrylamide | 0.3–0.5 kg. |
| Lime CaO or Ca(OH)$_2$ | 12–15 kg. |
| Bentonite | 20–28 kg. |

*Talc may be omitted from this composition

A preferred composition of the chemical agent of this invention per 101 kg is set forth in Example 5:

| EXAMPLE 5 | |
|---|---|
| COMPOUNDS | WEIGHT/101 KG. |
| Talc | 2 kg. |
| Adipic acid or acid salt | 2.5 kg. |
| Aluminum sulfate | 20 kg. |
| Activated bentonite | 42 kg. |
| Flocculating agent | 1 kg. |
| Lime | 13.5 kg. |
| Bentonite | 20 kg. |

The chemical agent of this invention is prepared by a special process, wherein the order in which the individual compounds of the mixture are introduced for mixing is very important, since random mixing of the individual compounds will not yield an acceptable bonding adsorbant. The adipic acid (and talc, if included) are first introduced and blended into a homogeneous mixture. The aluminum sulfate or ferric sulfate then is added and intermixed. The activated bentonite, flocculating agent, lime, and calcium bentonite then are introduced and blended one by one. After each addition, the mixing is accomplished until a uniform, homogenous mixture has been formed wherein the succeeding compound may be supplied. After completing the mixing procedure, the resulting chemical agent is sealed into air tight plastic bags or other suitable air tight containers.

The normal, commercial grain size of the individual compounds is essentially fine. For some purposes, however, it is possible to depart from the grain size and a finer or coarser product may be chosen for any or all of the components.

In the use of this chemical agent for the cleaning of contaminated waste water, the waste water and the agent are very thoroughly and vigorously mixed. This is preferably carried out by a mixing turbine, so that the particles of the mixture according to the invention come intimately in contact with the contaminants contained in the waste water.

The amount of the agent to be added to the waste water to be purified is governed, of course, by the degree of contamination of the waste water and also by the type of contamination. For a waste water to be purified which contains less than 1% oil, about 2 kg of the agent or composition of Example 5 are used per cubic meter of waste water. In each case, the flocculating agent can be eliminated from the composition, as in Example 1, and added after encapsulation. If the waste water to be cleaned contains unknown amounts of harmful substnaces, oil or the like, or in any case more than about 1%, a preliminary test should be conducted to determine the proper proportion of the chemical agent of this invention to be added. Incremental amounts of the composition can be added in the laboratory to a predetermined volume of a representative waste water sample until the waste water is visibly or measurably substantially clear.

The introduction of the chemical agent into the contaminated waste water can take place either continuously or discontinuously. The harmful substances found in the waste water, namely oil, fat, dyestuffs, and the like are adsorbed very quickly within the platelets of the activated bentonite so that by filtration or other similar processes they can be separated. The water after separation is fully clear, reacts chemically in the neutral range, and has a pH value of approximately 7.

While one form of the invention has been described, it will be understood that the invention may be utilized in other forms and environments, so that the purpose of the appended claims is to cover all such forms of devices not disclosed but which embody the invention disclosed herein.

I claim:

1. A chemical composition for the treatment of contaminated waste waters, especially waste waters in the form of oily emulsions, the agent comprising activated bentonite; bentonite containing calcium aluminum silicate in an amount of at least 30% based on the dry weight of activated bentonite; lime (CaO or $Ca(OH)_2$ in an amount of at least 50% based on the dry weight of bentonite containing calcium aluminum silicate; a contaminant coagulant; and an acid or acid salt.

2. The chemical composition of claim 1 wherein said contaminant coagulant comprises aluminum sulfate, ferric sulfate or mixture thereof in an amount of 5–60% based on the dry weight of activated bentonite.

3. The composition of claim 2 wherein said acid or acid salt comprises 0.2–10% based on the dry weight of activated bentonite.

4. The bentonite composition of claim 4 wherein said acid or acid salt comprises adipic acid.

5. The composition of claim 1 further including talc, activated carbon, or mixture thereof, in an amount of aboiut 0.2 to 8% based on the dry weight of activated bentonite.

6. The composition of claim 3 further including a polymeric organic flocculating agent in an amount of at least 0.5% based on the dry weight of activated bentonite.

7. The composition of claim 5 wherein said flocculant comprises polyacrylamide having a molecular weight of at least one million included in an amount of 0.5 to 5% based on the dry weight of activated bentonite.

8. The chemical composition of claim 1 comprising, in percent by weight:

| Activated bentonite | 25–65% |
| Bentonite containing calcium aluminum silicate | 10–40% |
| Lime CaO or $Ca(OH)_2$ | 5–25% |
| Acid or acid salt | 1–5% |
| Aluminum sulfate or ferric sulfate | 5–35% |
| Flocculating agent | 0–2% |
| Talc | 0–5% |

9. The chemical composition of claim 8 comprising, in percent by weight:

| Activated bentonite | 25–60% |
| Bentonite containing calcium aluminum silicate | 15–30% |
| Lime CaO or $Ca(OH)_2$ | 8–20% |
| Aluminum sulfate or ferric sulfate | 10–30% |
| Acid or acid salt | 1–4% |
| Flocculating agent | .1–2% |

10. A process for the manufacture of a chemical agent for the purification of waste waters comprising the steps of:
mixing an acid or acid salt with aluminum sulfate or ferric sulfate to form a substantially homogeneous mixture;
adding activated bentonite to the mixture and mixing until substantial homogeneity is achieved;
adding a polymeric organic flocculating agent and mixing until substantial homogeneity is achieved;
adding lime to the mixture and mixing unitl substantial homogeneity is achieved; and.
adding bentonite containing at least 5% by weight calcium aluminum silicate, and mixing until the mixture is substantially homogeneous.

11. The method of claim 10 further including mixing talc with said acid or acid salt prior to addition of said aluminum sulfate or ferric sulfate.

12. The method of claim 10 wherein said activated bentonite is acid activated bentonite comprising approximately, by weight 40–70% $SiO_2$; 10–30% $Al_2O_3$; 1–5% CaO; 1–8% MgO; and 1–5% $Na_2O + K_2O$.

13. The method of claim 1 wherein said activated bentonite is acid activated bentonite comprising approximately 56.7% $SiO_2$; 20.2% $Al_2O_3$; 2.9% CaO; 4.3% MgO; and 2.7% $Na_2O + K_2O$.

14. A method of purifying waste water comprising adding a chemical composition to said waste water comprising the following components in the specified amounts per cubic meter of waste water

| Activated bentonite | 0.5–1.0 kg. |
| Bentonite containing calcium aluminum silicate | 0.4–0.6 kg. |
| Lime CaO or $Ca(OH)_2$ | 0.2–0.3 kg. |
| Aluminum sulfate or ferric sulfate | 0.3–0.5 kg. |
| Acid or acid salt | .04–.06 kg. | and filtering said water to remove solids therefrom.

15. The method of claim 14 wherein said chemical composition further includes the following components added in the amounts specified per cubic meter of waste water:

| Talc | 0.3–.05 kg. |
| Flocculating agent | .006–.01 kg. |

16. The process of claim 14 further including adding a polymeric flocculating agent to said waste water in an amount of 0.006 to 0.01 kg. per cubic meter of waste water prior to filtering.

* * * * *